June 4, 1963
G. O. CONNER
3,092,425
DIE SET BEARING RETAINER
Filed Dec. 22, 1955
2 Sheets-Sheet 1
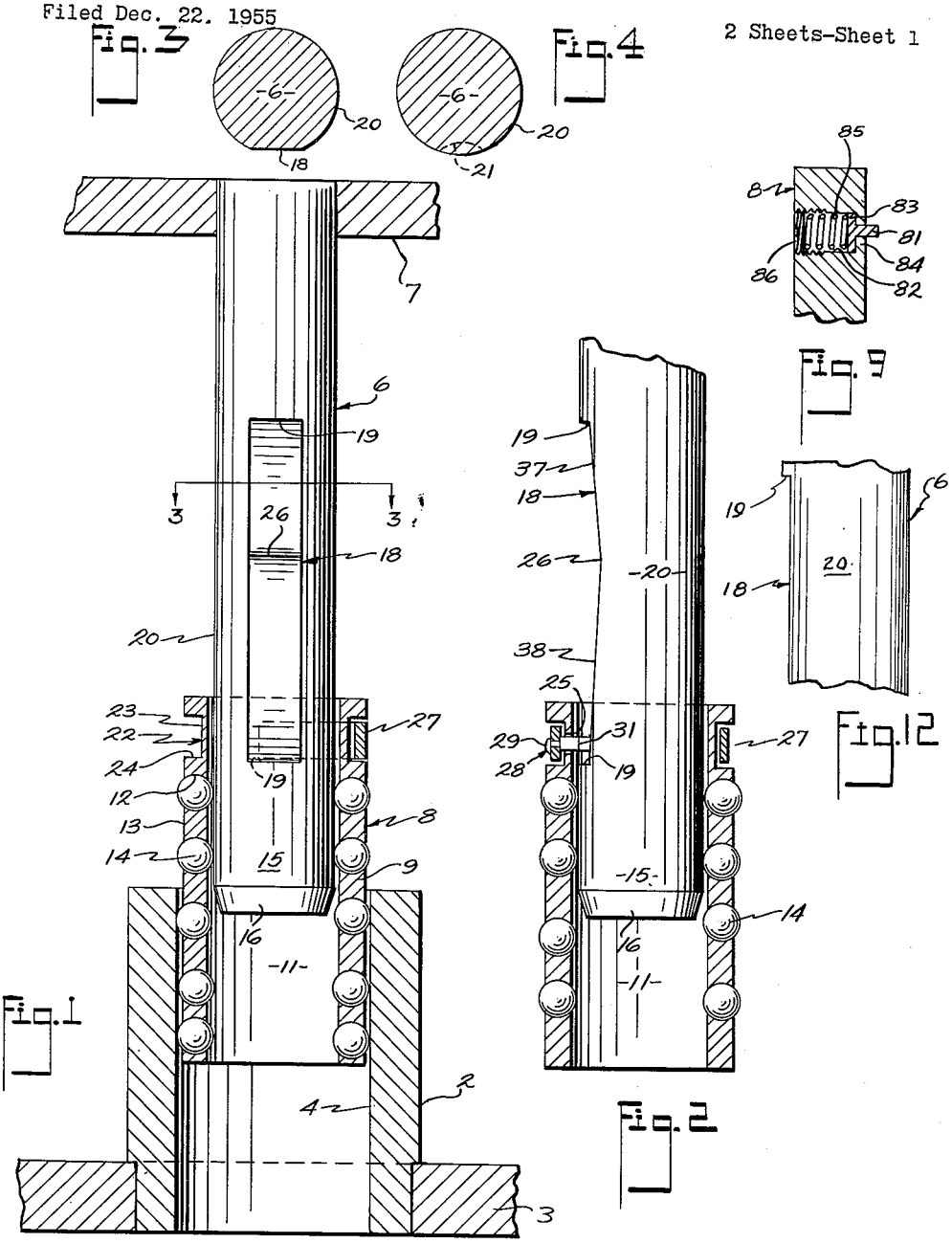
INVENTOR.
GUY O. CONNER
BY
*J. D. Douglass*
HIS ATTORNEY

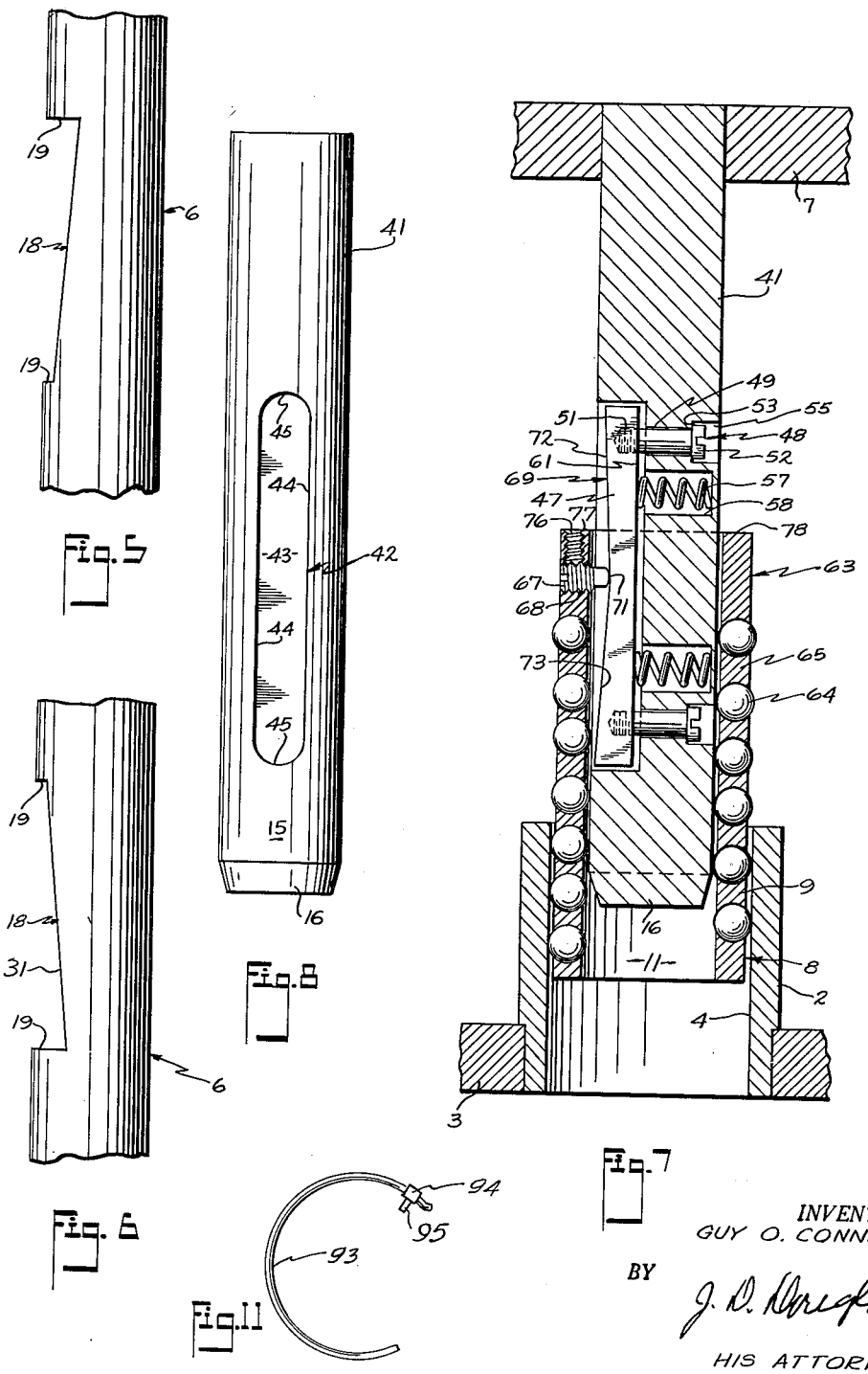

United States Patent Office 3,092,425
Patented June 4, 1963

3,092,425
DIE SET BEARING RETAINER
Guy O. Conner, 1118 Mount Vernon Blvd.,
Cleveland Heights, Ohio
Filed Dec. 22, 1955, Ser. No. 554,782
22 Claims. (Cl. 308—6)

This invention relates to improvements in die sets adjustable for use in punch presses or similar machines and more particularly to an improvement in a die set of the character shown in my Patent No. 2,422,774 of June 24, 1947.

The die sets manufactured according to the patent include a leader pin guide sleeve having a bore extending therethrough, being secured to one plate and a leader pin secured to the other plate and extending into said bore with bearings interposed between the guide sleeve and pin, said bearings being normally under loaded conditions. In order to maintain the bearings in the desired position, they are disposed in a bearing retainer which is interposed in the space between the leader pin and the guide sleeve.

Heretofore it has been desirable to secure the bearing retainer to the leader pin in such a manner, that when the leader pin is removed from the guide sleeve, the bearing retainer and its disposed bearings will not fall off the end of said pin. This is usually effected by providing a longitudinally extending groove in the leader pin having ends spaced from the ends of the leader pin and into which a pin, disposed in an aperture in press fit relationship in the bearing retainer extends. When the leader pin is removed from the guide sleeve, the bearing retainer is prevented from dropping off the end of the leader pin due to the pin in the bearing retainer extending into the groove and engaging the end of the groove. To provide the leader pin with the necessary groove, requires a machining operation which increases the manufacturing cost of the device. Also, the pin disposed in the bearing retainer is difficult to remove, thereby preventing easy disassembly of the leader pin and bearing retainer for replacement or maintenance thereof.

The foregoing, although satisfactory to retain the bearing retainer on the leader pin, in spite of the increased cost, does not cure another undesirable phenomena that occurs during the operation of such a device. Although the bearings are interposed between the leader pin and guide sleeve under loaded conditions, it has been found that during the operation of the device there is a tendency for the bearing retainer, together with its bearings, to creep within the bore of the guide sleeve during the relative movement of the leader pin so that the bearing retainer, leader pin and guide sleeve are not maintained in proper alignment. It has been found that the bearing retainer will either creep downwardly during operation or in some instances creep upwardly within said guide sleeve bore.

By the present invention I have provided an improved die set which greatly decreases the manufacturing problems as well as its cost, simplifies the assembly and disassembly, particularly the leader pin and the bearing retainer assembly, and which automatically causes the bearing retainer to maintain its proper alignment between the leader pin and the guide sleeve.

Other advantages will be realized by those versed in the art, and by reference to the accompanying description and drawings which form a part of this specification wherein:

FIG. 1 is an elevational view, partly in section, of a die set employing my invention;

FIG. 2 is an elevational view, partly in section, of the die set of FIG. 1, being revolved 90° thereto;

FIG. 3 is a view of the leader pin showing its surface configuration taken on the line 3—3 of FIG. 1;

FIG. 4 is a view of the leader pin showing another surface configuration;

FIG. 5 is a partial elevational view of the leader pin illustrating one longitudinal surface configuration;

FIG. 6 is a partial elevational view of the leader pin showing another configuration of longitudinal surface;

FIG. 7 is an elevational view, shown partly in section, of a second embodiment of a die set embodying my invention;

FIG. 8 is an elevational plan view of the leader pin of the embodiment of FIG. 7;

FIG. 9 is a partial sectional view showing still another type of retainer pin construction;

FIG. 10 is a plan view of a spring retainer showing a third embodiment thereof;

FIG. 11 is a plan view of a spring retainer of a fourth embodiment thereof; and

FIG. 12 is a partial elevational view of a leader pin.

Generally, my invention comprises a positioning mechanism being operative to maintain proper alignment between the guide sleeve, bearing retainer and leader pin, and also, one that enables the die set to be easily disassembled for maintenance replacement.

More particularly, I provide a releasable locking mechanism that prevents the bearing retainer from becoming misaligned relative to the leader pin or from becoming entirely disassociated therewith.

As is well known to those versed in the art, certain classes of articles are manufactured by the use of presses. These presses usually employ a base which holds a die and a reciprocable plunger or plate which carries another die which is capable of mating with the die upon the base. The material to be fabricated is placed between the two dies, and upon operation thereof, the desired shape is formed.

Although the inventive concepts contained herein are illustrated by their use in the above particular type of machine, it is apparent that the teachings thereof are readily adaptable to other uses and machinery.

Referring now to the drawings wherein like elements are designated by like reference characters, the numeral 2, FIG. 1, identifies a guide sleeve that may be secured in a vertical position to the base 3 of the machine. A circular bore 4 is formed axially within the guide sleeve, extending longitudinally therethrough; the surface of said bore being processed to provide adequate bearing surface for associated structure presently to be described.

A round elongated leader pin 6, having its upper end releasably fastened to the reciprocable plate 7 in any well known manner, extends downwardly into the bore in the guide sleeve, and upon reciprocation of said plate, moves within the confines of the bore.

A hollow cylindrical bearing retainer 8, having walls 9 of a predetermined thickness defining a centrally disposed channel 11, is interposed between the guide sleeve 2 and leader pin 6. Bearings, in the form of balls 14 are disposed in apertures 12 formed in the walls 9 of the bearing retainer, said apertures being of sufficient diameter to allow the balls to rotate freely. The walls of the apertures converge slightly at their inner ends to prevent the balls from falling into the channel 11, and minute portions of the outer surface 13 of the retainer, adjacent the apertures, are deformed inwardly to overlap the outer end of the walls of the apertures thereby preventing said balls from falling outward.

The balls, although shown to be disposed in said apertures about the periphery of said retainer, in spaced rows, may be disposed within said retainer in any desired configuration.

The leader pin 6 is placed within the channel 11 of the bearing retainer 8, forcing the balls 14 outward within their apertures until sufficient clearance is obtained to allow the leader pin to extend through the channel.

Upon reciprocation of the leader pin, diametrically opposite points on the balls are in engagement with the outer surface of the leader pin and walls of the bore 4.

The end 15 of the leader pin 6 may be formed with a chamfer 16 which enables the balls 14 to be more easily moved outward upon insertion of the leader pin.

The bearing retainer 8 and disposed leader pin 6 are inserted within the bore 4 of the guide sleeve 2 and the balls 14 are forced inward wherein diametrically opposite points of the balls engage the walls of the bore 4 and the outer surface of the leader pin 6 to properly position said leader pin 6 and associated plate 7 relative to the base 3.

The size of the balls 14 are determined by the lateral movement desired between the leader pin 6 and guide sleeve 2.

Upon operation of the press (not shown), the leader pin 6 reciprocates within the bearing retainer 8, and the bearing retainer is also reciprocated within the bore 4 of the guide sleeve. The ratio of movement between the leader pin and bearing retainer is 2:1, or in other words, the leader pin moves twice the distance the bearing retainer moves per unit of time.

Due to manufacturing tolerances the relative movement between the leader pin and bearing retainer may become unsatisfactory wherein the optimum coaction therebetween is destroyed.

More specifically, during the downward or upward stroke of the leader pin 6, the bearing retainer 8 may be carried too far into or out of the bore 4 of the sleeve guide 2. And, after successive reciprocations of the leader pin, said pin may become sufficiently disengaged from within the channel 11 of the bearing retainer to allow the plate 7 and base 3 of the press to become misaligned, resulting in injury or destruction to the associated structure, particularly the dies attached thereto.

In order to prevent the leader pin and bearing retainer from becoming disassociated, means are provided to allow longitudinal movement of the leader pin relative to the bearing retainer within predetermined limits.

This is accomplished by providing interconnecting means or coupling means between said leader pin and bearing retainer that allows said members to function as intended, without effecting their respective operations.

A shallow surface 18, is formed on the leader pin 6 below the plane of the bearing surface 20 extending longitudinally thereof, and having ends 19 spaced from the ends of said leader pin. The transverse configuration of said surface 18, as shown in FIG. 3, may be flat, thereby forming a chord upon the circumference of the leader pin. It is also contemplated that the surface may curve inward toward the axis of the pin forming a valley 21 having a concave configuration as shown in FIG. 4 or it may have any other desired irregular, inwardly extending configuration.

Longitudinally of the axis of the leader pin, said surface 18 may begin at the upper end 19 thereof, and extend downward and inwardly toward the axis of the leader pin to the opposite end 19, as shown in FIG. 6. This particular configuration is adaptable to assemblies wherein the bearing retainer 8 tends to rise out of the sleeve guide 2 upon reciprocation of the leader pin.

The surface 18 may also be planar, longitudinally of said leader pin, having end portions 19, as shown in FIG. 12.

The bearing retainer 8, FIGS. 1 and 2, is formed with a circumferential groove 22 adjacent one end thereof, having a base 23 and side walls 24. An aperture 25 is formed in the base 23, extending axially therethrough and opening into the channel 11.

A C-shaped spring clip 27 is placed within the groove 22, embracing the base thereof, and a pin 28 having a head 29 rigidly fixed to one end of the clip is formed with a shank 31 that extends through the aperture 25 and into the channel 11. The shank 31 is slightly smaller in diameter than the diameter of aperture 25 thereby enabling said pin to be moved freely within the aperture against the pressure exerted by the spring clip 27.

The spring clip may be rectangular in cross-section, as is shown in FIG. 2, or of any other desired configuration.

A clip 89, FIG. 10, having a U-shaped projection 91 formed on one end, which may be inserted into a suitable aperture, similar to aperture 25, may also be adaptable to said leader pin structures.

It is also contemplated that a clip 93, FIG. 11, having a block 94, secured to one end thereof, and a pin 95 fixed to the underside of said block which may be inserted within aperture 25, may also be used with said heretofore mentioned leader pin and bearing retainer structure.

The leader pin 6 is inserted into the channel 11 of the bearing retainer 8, and orientated therein, so that the end of the shank 31 of pin 28 engages the surface 18.

The leader pin, therefore, is capable of movement relative to the bearing retainer until the shank 31 of pin 28 strikes either one of the ends 19 of said surface 18 wherein subsequently thereto, said leader pin and bearing retainer may move within the bore of the sleeve guide 2 as one integral unit.

In using a leader pin 6 having a surface configuration as shown in FIG. 6, wherein the bearing retainer 8 tends to rise upward, the shank 31 of the pin 28 normally engages the lower end 19 of surface 18 when the leader pin is fully retracted from within the guide sleeve. When the leader pin is carried downward by the plate 7, the outwardly cammed surface 18 forces the shank 31 of pin 28 outward through aperture 25 against the pressure of spring clip 27. As the downward stroke of the leader pin 6 continues, a greater force is exerted upon the pin and spring clip by surface 18 thereby increasing the coupling between the leader pin and bearing retainer, whereby said bearing retainer is forced sufficiently into the bore 4 of the guide sleeve 2 to maintain the necessary ratio of movement between said members and alignment of associated structure. On the upward stroke of the leader pin the pressure exerted upon the pin 28 and spring clip 27 is lessened, thereby decreasing the coupling. The leader pin therefore exerts a decreasing pulling force upon the bearing retainer as said pin is being retracted from the guide sleeve.

It is therefore realized that in using the surface configuration of FIG. 6, there is an increase in coupling between the leader pin 6 and bearing retainer 8 as the leader pin extends into the guide sleeve 2, and a decrease in coupling between said members as the leader pin is retracted from said guide sleeve.

In using a leader pin having a surface configuration as shown in FIG. 5, wherein the bearing retainer 8 tends to be carried too far into the guide sleeve 2, the shank 31 of the pin 28 normally engages the lower end 19 of surface 18 when the leader pin is fully retracted from within the guide sleeve 2.

When the leader pin is forced downward the pin 28 in engagement with the inwardly cammed surface 18, rides upward along said surface, thereby decreasing the coupling between the leader pin 6 and bearing retainer 8. During the upward stroke of the leader pin, said surface 18 forces the pin 28 outward against the pressure of the spring clip 27, thereby increasing the coupling between the leader pin 6 and bearing retainer 8, and sustaining the proper ratio of movement between said members.

Therefore, a decrease in coupling is realized on the downstroke of leader pin 6, and an increase in coupling on the upward stroke of said pin.

On assemblies wherein the relative movement between the leader pin 6 and bearing retainer 8 exceeds the preferred optimum ratio of 2:1 on both downward and upward stroke of said pin 6, surface 18 having a configuration as shown in FIG. 2 is utilized. The retainer pin 28 normally engages the apex 26 when the leader pin 6 is fully retracted from or inserted within the guide sleeve.

If the relative movement between the leader pin 6 and bearing retainer 8 becomes too great on the downward stroke of the leader pin, that is, when the leader pin travels more than twice the distance than that experienced by the bearing retainer, the pin 28 will engage the upper outwardly extending portion 37 of surface 18, causing greater pressure to be exerted upon spring clip 27, thereby increasing the coupling between the leader pin 6 and bearing retainer 8 and decreasing the relative movement therebetween.

The apex 26 of surface 18 is positioned so that the relative movement between the leader pin 6 and bearing retainer 8 is never less than optimum on the downstroke of the leader pin 6, but it is conceivable that after excessive wear of the balls 14 in the bearing retainer, the coupling between the leader pin and bearing retainer may be decreased a sufficient amount whereby the bearing retainer may tend to fall into the bore 4 of the guide sleeve 2 as a result of its own weight. This deficiency of coupling is corrected by the lower outwardly extending portion 38 of surface 18. Thus, pin 28 will engage said lower portion causing greater pressure to be exerted upon spring clip 27, increasing the coupling between said leader pin and bearing retainer to the optimum value.

The relationship between the lower portion 38 of surface 18 and pin 28 also compensates for loss of coupling between the leader pin 6 and bearing retainer 8 during the upward stroke of the leader pin, whereby said pin 6 tends to be retracted from within the bearing retainer too quickly. The pin 28 engages the lower portion 38 of surface 18 causing greater pressure to be exerted upon spring clip 27 thereby increasing the coupling to the optimum value.

Another embodiment utilizing the same inventive concepts is shown in FIGS. 7 and 8.

A leader pin 41, is formed with a longitudinally extending slot 42, having a base 43, spaced parallel side walls 44, and curved end walls 45.

A pressure block 47 is placed within said slot 42, and movably secured thereto by means of screws 48, extending through clearance holes 49 formed in leader pin 41 and into threaded engagement with apertures 51 in said block. The head 52 of each screw 48 engages a shoulder 53 formed on the inner end of countersunk portion 55 of each hole 49.

Springs 57, disposed in blind holes 58 placed in said leader pin and opening into said slot 42, extend into said holes and engage the base 61 of the block 47 and urge said block outward against the resistance of screws 48.

The bearing retainer 63 has balls 64 rotatably disposed in its walls 65 which react with the bore of the guide sleeve and leader pin in the same manner as disclosed in the previous embodiment.

A retainer pin 67, threadingly engaged in the aperture 68 formed in the upper end of the bearing retainer 63 engages a cam 69 formed on the side of the block opposite to the base which may be of any longitudinal configuration as disclosed in the several embodiments heretofore.

The cam 69, as shown in FIG. 7, is shown to have an apex 71, and upper 72 and lower 73 surfaces, each extending from the apex to a higher plane at the ends of said block.

The retainer pin 67 is normally positioned at the apex 71 of said cam when the leader pin 41 is either fully retracted from or inserted into the guide sleeve 2.

A locking screw 76, threadingly engaged in an aperture 77 extending from the top surface 78 of the bearing retainer 63 and opening into aperture 68, is threaded therein to engage the retainer pin 67 and prevent said pin from being moved, once it has been positioned.

In operation, if upon the reciprocation of the leader pin 41, the bearing retainer 63 tends to rise out of the bore 4 of the guide sleeve 2, the retainer pin 67 will engage and slide over the upper cam surface 72, on the downward stroke of said pin 41, pressing said block 47 into the slot 42 against the force exerted by springs 57, thereby incrementally increasing the coupling between the leader pin 41 and bearing retainer 65 to provide the optimum ratio of relative movement therebetween.

If, upon reciprocation of the leader pin 41, the bearing retainer 63 tends to be carried too far into the bore 4 of the guide sleeve, the retainer pin 67 will engage and slide over the lower cam surface 73, on the upward stroke of said pin 41, again pressing said block 42 against the force of springs 57, and thereby incrementally increasing the coupling to provide the optimum ratio of relative movement between said leader pin 41 and bearing retainer 65.

The relative movement between the bearing retainer 65 and leader pin 41 is restricted within the length of the slot 42; either of the end walls 45 of which may engage the retainer pin 67 whereafter said members move as one integral unit.

FIG. 9 shows still another type of retainer pin structure that may be adaptable to the leader pin configuration disclosed in the embodiments heretofore.

More particularly, referring to FIG. 9, a retainer pin 81 is movably disposed in an aperture 82 formed on wall 9 of bearing retainer 8. An enlarged head 83 of the pin 81 is capable of engaging an annular shoulder 84 formed on the inner end of aperture 82. A coil spring 85 is placed within said aperture and into pressure engagement with the head 83 of pin 81, and a cap 86 is placed over said spring, being in press fit relationship with the walls of said aperture, to secure said spring therein.

The retainer pin 81 and coil spring 85 may operate in conjunction with any of the heretofore disclosed leader pin configurations to incrementally regulate the coupling between the leader pin and bearing retainer thereby providing the optimum ratio of relative movement.

Although a certain angularity representing the longitudinal surface engaged by the spring pressed pin, is illustrated in the drawings, it is contemplated that the angularity or slant of this surface may be varied from that illustrated. In the die set described in the patent it has been discovered that for some reasons, the exact cause of which is not known, creepage of the bearings and the retainer during operation could be in either direction. That is, sometimes the bearing retainer crept upwardly and the other times it crept downwardly, although as far as could be determined the structures were exactly the same. Therefore, it is contemplated that the slant of the surface may be made relatively small and will overcome the creeping tendency even though the slant is not sufficient to cause the bearing to be moved on the surface under unloaded conditions. In such a case the bearing, when out of the sleeve, would drop on the pin until it hit the upper stop 19 but the slant of the retainer engaging surface would still be sufficient to overcome the creeping phenomena.

It will thus be seen that I have provided an improved die set where the machining costs are materially reduced because the broaching of the retainer engaging surface is a relatively simple operation as compared with the expensive machining operation necessary in pin and groove construction of the prior art previously described. It is also apparent that the assembly and disassembly of the device may be effected much more rapidly than was possible in the previously described pin and groove method. In assembly the chamfer on the end of the leader pin engages the spring pressed pin in the bearing retainer and forces it outwardly allowing the bearing to be inserted on the pin, and then, if the pin has not already been in line with the pin engaging surface it may be rotated until it engages with that surface.

When it is desired to remove the bearing from the leader pin, all that is necessary is to rotate the bearing retainer until the spring pressed pin rides upon the cylindrical surface of the leader pin after which it may be readily slid off the end of the leader pin.

Having thus described and illustrated my invention in several embodiments herein, I am aware that departures can be made therefrom without departing from the scope of the concepts thereof.

I claim:

1. A die set comprising a leader pin and guide means, anti-friction bearing means interposed between said leader pin and guide means and in engagement therewith, said leader pin being reciprocally movable within said guide means and operable to move said bearing means relative to said leader pin, and variable pressure coupling means interconnecting said leader pin and bearing means to regulate the relative longitudinal movement between said leader pin and bearing means at all times when the leader pin is in guiding position within the guide.

2. A die set comprising a leader pin and guide means, anti-friction bearing means interposed between said leader pin and guide means and in engagement therewith, said leader pin being reciprocally movable within said guide means and operable to move said bearing means within said guide means relative to said leader pin and means interconnecting said leader pin and bearing means to regulate the relative movement therebetween comprising a planar surface formed in the leader pin, resilient means connected to said bearing means and engaging with said surface.

3. A die set comprising a leader pin having a bearing surface and a guide sleeve into which said leader pin is reciprocally movable, bearing means interposed and movable between said leader pin and guide sleeve, said leader pin having a surface disposed in a plane below its bearing surface and resilient means movably connected to said bearing means and engaging said lower surface to provide a variable pressure connection between said leader pin and bearing means when said leader pin and bearing means are movable within said sleeve.

4. A device as described in claim 3 wherein the surface below the bearing surface on the leader pin terminates in abutments for engagement with said resilient means.

5. A die set comprising a leader pin having a bearing surface and a guide sleeve into which said leader pin is reciprocally movable, bearing means interposed and movable between said leader pin and guide sleeve, said leader pin having a surface disposed in a plane below its bearing surface, and resilient means movably connected to said bearing means and engaging said lower surface to provide a variable pressure connection between said leader pin and bearing means when said leader pin and bearing means are movable within said sleeve, and said leader pin and bearing means being rotatably movable relative to each other against said resilient means to release said connection.

6. A die set comprising a leader pin having a bearing surface and guide means, anti-friction bearing means interposed between said leader pin and guide means and in engagement therewith, said leader pin being reciprocally movable within said guide means and operable to move said bearing means within said guide means relative to said leader pin, said leader pin having a longitudinally extending surface below the bearing surface, pin means movably disposed in said bearing means and engaging with said surface, a variable pressure connection between said leader pin and bearing means, comprising spring means carried by said bearing means and biasing said pin means into engagement with said surface at all times when the leader pin is in guiding position within the guide.

7. A die set comprising a leader pin having a bearing surface and guide means, anti-friction bearing means interposed between said leader pin and guide means and in engagement therewith, said leader pin being reciprocally movable within said guide means and operable to move said bearing means within said guide means relative to said leader pin, means interconnecting said leader pin and bearing means providing a resilient coupling therebetween comprising a longitudinally extending surface formed on said leader pin disposed below the bearing surface, pin means movably disposed in said bearing means and engaging said longitudinally extending surface at all times when the leader pin is in guiding position within the guide, a groove formed in said bearing means and spring means disposed therein and in engagement with said pin means.

8. A die set comprising a leader pin having a bearing surface and a guide sleeve into which said leader pin is reciprocally movable, bearing means interposed between said leader pin and guide sleeve and movable within said sleeve, a releasable coupling between said leader pin and bearing means comprising a planar surface formed on said leader pin and disposed below the bearing surface, and resiliently movable pin means on said bearing means engaging said surface.

9. A die set comprising a leader pin and guide means, anti-friction bearing means interposed between said leader pin and guide means and in engagement therewith, said leader pin being reciprocally movable within said guide means and operable to move said bearing means within said guide means relative to said leader pin, means interconnecting said leader pin and bearing means providing a resilient coupling therebetween comprising a longitudinally extending surface on said leader pin, pin means movably disposed in said bearing means and engaging said surface, peripheral groove means formed in said bearing means, a C-shaped spring disposed in said groove means and engaging said pin means to bias it into engagement with said surface at all times when the leader pin is in guiding position within the guide.

10. A die set comprising a leader pin and guide means, anti-friction bearing means interposed between said leader pin and guide means and in engagement therewith, said leader pin being reciprocally movable within said guide means and operable to move said bearing means within said guide means relative to said leader pin, means interconnecting said leader pin and bearing means providing a resilient coupling therebetween comprising a longitudinally extending planar surface on said leader pin, spring means disposed on said bearing means and having a portion near its end extending through the bearing means into engagement with said planar surface.

11. A die set comprising a leader pin and guide means, anti-friction bearing means interposed between said leader pin and guide means and in engagement therewith, said leader pin being reciprocally movable within said guide means and operable to move said bearing means within said guide means and means interconnecting said leader pin and bearing means providing a variable coupling therebetween comprising a longitudinally extending planar surface formed on said leader pin beginning adjacent one end of said leader pin and extending linearly inward toward the axis of said leader pin, resilient means connected to said bearing means and slidably engaging said planar surface when said leader pin is moved relative to said bearing means.

12. A die set comprising a leader pin having one end disposed in guide means, bearing means interposed between said leader pin and guide means and in engagement therewith, said leader pin being reciprocally movable within said guide means and operable to move said bearing means relative to said leader pin, means interconnecting said leader pin and bearing means providing a variable coupling therebetween comprising a surface formed on said leader pin beginning adjacent the end disposed in said guide means and extending linearly therefrom longitudinally of said leader pin and inwardly toward the axis thereof, and resilient means connected to said bearing means and engaging said surface at all times when the leader pin is in guiding position within the guide.

13. A die set comprising a leader pin having one end disposed in guide means, bearing means interposed between said leader pin and guide means and in engagement therewith, said leader pin being reciprocally movable within said guide means and operable to move said bearing means relative to said leader pin, means interconnecting said leader pin and bearing means providing a variable coupling therebetween comprising a surface formed on said leader pin, beginning on the end opposite to that disposed in said guide means and extending linearly therefrom longitudinally of said leader pin and inwardly toward the axis thereof, and resilient means connected to said bearing means and engaging said surface at all times when the leader pin is in guiding position within the guide.

14. A die set comprising a leader pin having one end disposed in guide means, bearing means interposed between said leader pin and guide means and in engagement therewith, said leader pin being reciprocally movable within said guide means and operable to move said bearing means relative to said leader pin, means interconnecting said leader pin and bearing means and providing a variable coupling therebetween comprising a surface formed on said leader pin beginning adjacent each end thereof and extending linearly therefrom longitudinally of said leader pin and inwardly toward its axis to define an apex, means connected to said bearing means engaging said apex and movable over said linearly extending surface when said leader pin is moved relative to said bearing means at all times when the leader pin is in guiding position within the guide.

15. A die set comprising a leader pin having one end disposed in guide means, bearing means interposed between said leader pin and guide means and in engagement therewith, said leader pin being reciprocally movable within said guide means and operable to move said bearing means relative to said leader pin, means interconnecting said leader pin and bearing means and providing a variable coupling therebetween comprising a planar surface formed on said leader pin, beginning adjacent each end thereof and extending linearly therefrom longitudinally of said leader pin and inwardly toward its axis to define an apex, and resiliently movable pin means on said bearing means engaging said apex and slidable upon said linearly extending planar surface when said leader pin is moved longitudinally relative to said bearing means.

16. A die set comprising a leader pin and guide means, anti-friction bearing means interposed between said leader pin and guide means and in engagement therewith, said leader pin being reciprocally movable within said guide means and operable to move said bearing means within said guide means relative to said leader pin, means interconnecting said leader pin and bearing means comprising a longitudinally extending transversely curved groove on said leader pin, means movably disposed in said bearing means and having a portion disposed in resilient engagement with the surface of said groove being operable to limit rotational movement of said leader pin relative to said bearing means.

17. A die set comprising a leader pin having a bearing surface and guide means, anti-friction bearing means interposed between said leader pin and guide means and in engagement therewith, said leader pin being reciprocally movable within said guide means and operable to move said bearing means within said guide means relative to said leader pin, and means interconnecting said leader pin and bearing means to regulate the relative movement therebetween comprising a surface on the leader pin below the plane of said bearing surface, resilient means connected to said bearing means and engaging said lower surface and spaced apart stop means on the leader pin to limit the movement of said leader pin relative to said bearing means.

18. A die set comprising a leader pin and guide means, anti-friction bearing means interposed between said leader pin and guide means and in engagement therewith, said leader pin being reciprocally movable within said guide means and operable to move said bearing means within said guide means relative to said leader pin, means interconnecting said leader pin and bearing means providing a resilient coupling therebetween comprising a longitudinally extending surface below the bearing engaging surface on said leader pin, means movably disposed in said bearing means and engaging said longitudinally extending surface at all times when the leader pin is in guiding position within the guide, groove means formed in said bearing means, a spring disposed in said groove means and engaging said movable means to bias it into engagement with said longitudinally extending surface.

19. A die set wherein a cylindrical leader pin and a leader pin guide are provided with anti-friction bearing means including a bearing retainer therebetween, means for holding the retainer means in a predetermined position upon movement of the leader pin out of the guide comprising a planar surface formed on the leader pin and terminating in at least one shoulder spaced from the end of the leader pin, and means on the bearing retainer extending below the bearing surface on the leader pin and in proximity to said planar surface for holding said bearing against removal from the leader pin.

20. A die set including a cylindrical leader pin and a guide with anti-friction bearing means interposed between the leader pin and guide and retainer means for holding the bearing means, means for holding the retainer means in a predetermined position upon movement of the leader pin out of the guide comprising a surface formed in the leader pin bearing surface below the bearing surface and terminating in at least one shoulder carried by the retainer means and extending below the bearing surface on the leader pin, the surface below the bearing surface extending longitudinally of the pin and being defined by the removal of a portion of the pin, the portion removed being a cross-sectional area that is a segment of a circle.

21. A die set including a cylindrical leader pin and a guide with anti-friction bearing means interposed between the leader pin and guide and retainer means for holding the bearing means, means for holding the retainer means in a predetermined position upon movement of the leader pin out of the guide comprising a surface formed in the leader pin bearing surface below the bearing surface and terminating in at least one shoulder spaced from the end of the leader pin, and locking means carried by the retainer means and extending below the bearing surface on the leader pin, the surface below the bearing surface being formed by removal of a portion of the leader pin, the portion removed being a cylindrical surface intersecting the cylindrical surface of the leader pin.

22. A die set including a cylindrical leader pin and a guide with anti-friction bearing means interposed between the leader pin and guide and retainer means for holding the bearings, means for holding the retainer means in a predetermined position upon movement of the leader pin out of the guide comprising a surface formed in the leader pin bearing surface below the bearing surface and terminating in at least one shoulder spaced from the end of the leader pin, and locking means carried by the bearing retainer and extending below the bearing surface on the leader pin, the surface below the bearing surface being formed by the removal of a portion of the pin extending longitudinally thereof and terminating in a shoulder adjacent the end and being of concave cross-section.

References Cited in the file of this patent

UNITED STATES PATENTS

| | | |
|---|---|---|
| 1,256,748 | Von Post | Feb. 19, 1918 |
| 2,422,775 | Conner | June 24, 1947 |
| 2,541,262 | Mather | Feb. 13, 1951 |
| 2,774,430 | Blazek | Dec. 18, 1956 |